United States Patent

[11] 3,594,864

| [72] | Inventor | Dixie E. Gilbert |
| | | Bartlesville, Okla. |
| [21] | Appl. No. | 850,797 |
| [22] | Filed | Aug. 18, 1969 |
| [45] | Patented | July 27, 1971 |
| [73] | Assignee | Phillips Petroleum Company |

[54] MOLD ACTUATED PARISON STRETCHING DEVICE
8 Claims, 4 Drawing Figs.

| [52] | U.S. Cl. | 18/5 BE, 18/14 S |
| [51] | Int. Cl. | B29d 23/03 |
| [50] | Field of Search | 18/14 S, 14 R, 5 BM, 5 BB, 5 BE, 5 BT, 5 BZ |

[56] References Cited
UNITED STATES PATENTS

| 2,878,513 | 3/1959 | Slaughter | 18/5 BM UX |
| 3,048,889 | 8/1962 | Fischer et al. | 18/5 (BB) X |
| 3,114,172 | 12/1963 | Coste | 18/5 (BM) X |

FOREIGN PATENTS

| 225,919 | 7/1962 | Austria | 18/5 (BM) |

Primary Examiner—J. Spencer Overholser
Assistant Examiner—Michael O. Sutton
Attorney—Young and Quigg ABSTRACT: A parison preform held within a molding zone is gripped and stretched by means of a mechanism mechanically connected to the mold halves. As the mold halves close, jaw means are first converged to clamp the parison and then moved axially to stretch same.

INVENTOR.
D. E. GILBERT
BY
*Young + Quigg*
ATTORNEYS

MOLD ACTUATED PARISON STRETCHING DEVICE

BACKGROUND OF THE INVENTION

This invention relates to improved apparatus for stretching parison preforms preparatory to blow molding.

Traditionally, blow molded articles have been formed by the downward extrusion of a molten parison from an annular die into position between opposing mold halves. The mold halves are then closed and fluid pressure introduced into the parison to expand same into conformity with the mold. Recently, techniques have been developed whereby high strength articles having exceptional clarity and sparkle can be produced by blow molding a parison preform which has been cooled to room temperature and thereafter reheated to orientation temperature. This parison, while at orientation temperature, is first stretched longitudinally so as to achieve molecular orientation in the axial direction and is thereafter expanded against mold walls by the introduction of internal fluid pressure to achieve circumferential molecular orientation. It is apparent that the most economical manner to produce individual parison preforms for this operation is to extrude a continuous length of tubular material and thereafter sever it into individual work pieces. However, this necessitates carrying out the operations of sealing off one end of the parison and stretching same preparatory to blowing. Thus, the extra step of transferring these parison preforms to a molding zone, stretching, and sealing same detract to some extent from the advantages of using parison preforms obtained from a continuous extrudate. Also, since the polymer at orientation temperature is far below the ideal temperature for achieving a seal, and since orientation temperature is only a few degrees below the crystalline melting point, a variation in temperature of only a few degrees has a significant effect on the degree of orientation achieved, it is apparent that there is very little leeway for variation in the handling procedure for successive parisons.

SUMMARY OF THE INVENTION

It is an object of this invention to provide for stretching parison preforms preparatory to blow molding with a minimum of manipulative steps;

It is a further object of this invention to simplify the apparatus necessary to seal and stretch a parison preform; and It is yet a further object of this invention to allow more precise control over the manipulative steps in the formation of biaxially oriented hollow articles.

In accordance with this invention, gripping means connected through a mechanical linkage to opposing mold halves converges and then moves axially as the mold halves converge so as to grip and stretch a parison preform held within a molding zone.

BRIEF DESCRIPTION OF THE DRAWINGS

In the drawings, forming a part hereof, wherein like reference characters denote like parts in the various views.

DESCRIPTION OF THE PREFERRED EMBODIMENTS

The instant invention is applicable for the stretching of any hollow, elongated parison having a triangular, square, or round shape or the like, although its primary utility will be found in the stretching of cylindrical parison preforms.

The parison preforms which can be stretched in accordance with the instant invention can be made of any orientable crystalline material such as polymers of at least one mono-1-olefin having 2—8 carbon atoms per molecule, preferably polymers and copolymers of ethylene, propylene, and butene, more preferably polypropylene.

The parison preforms stretched in accordance with this invention can be formed by any suitable means, although the preferred means is to simply extrude a tube or pipe in a manner known in the art, and thereafter sever this continuous extrudate into workpieces of the desired length.

The parison preforms are heated to orientation temperature preparatory to sealing and blow molding. By orientation temperature, it is meant that temperature at which the crystalline polymers on stretching exhibit an increase in strength. For polymers of mono-1-olefins having 2—8 carbon atoms per molecule, this temperature is generally in the range of 1—50° F., preferably 10—30° F., below the crystalline melting point. The crystalline melting point can be determined by placing a small sample of the material to be tested on the heating stage of a polarizing microscope and recording the crystalline melting point as that temperature at which the last birefringence disappears on slow heating. The parison preforms can be reheated to this orientation temperature in an air oven, in a liquid bath, in a heating block, or by subjecting them to radiant heat, or any other suitable means.

It has been found that a superior seal can be obtained by preblowing the parison slightly prior to the time the parison is severed. It has further been found that by careful control of the time sequence, fluid under the pressure normally utilized for the main blow, that is a pressure of 60—200, preferably 90—150, p.s.i.g., can be utilized as the preblow fluid also. By timing of the introduction of this fluid to begin just after the mold has begun to close at which point, in accordance with the instant invention, the gripping means quickly converge to seal the parison, the parison will be preblown to the proper amount just as the molds reach their final forward position.

The longitudinal stretch ratio should be in the range of 1.1:1 to 8:1, preferably 1.5:1 to 2.5:1. By longitudinal stretch ratio is meant the ratio of the length of that portion being stretched (i.e., the portion of the parison between the gripping jaws and a thread forming head) after stretching to its length before stretching. A ratio of 1:1 would indicate no affirmative stretching prior to introduction of blow fluid.

Figure 1:
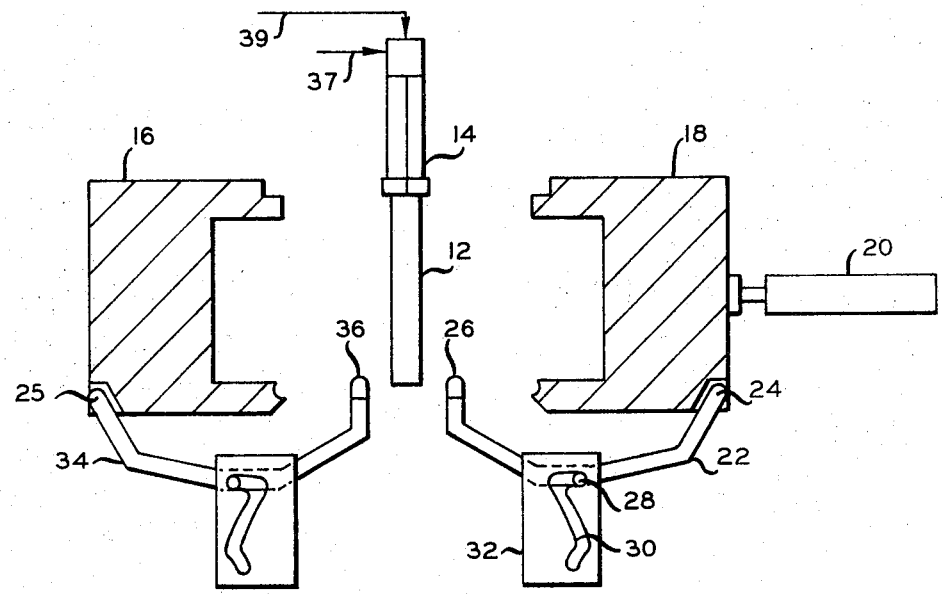
FIG. 1 is a side view partially in section of apparatus in accordance with this invention.

It is preferred that the parison be sealed and severed in an area which has been stretched. Thus, as shown in FIG. 1, the lower portion of the mold halves will come together on the stretched parison after the gripping means have moved axially downwardly below the lowermost portion of the mold halves to stretch the parison. However, it is possible when operating in accordance with the instant invention to effect an adequate seal by means of forming the gripping jaws in the shape of the desired shape for the sealing and severing means and providing for the furthermost axial travel of the gripping means to be coincidental with the lower leading edges of the mold so that as the mold closes, it contacts the gripping means which has just stretched the parison. In this way, the need for closing on a stretched portion of the parison to effect an adequate seal is circumvented, first because the gripping mechanism can be left in contact with the parison over a longer period of time without increasing the cycle time in that during the time the parison is being stretched, the seal can have time to form, even though the parison is at a temperature at which sealing is extremely difficult. Second, the cam surfaces are so contoured that the gripping jaws converge sufficiently to seal the parison off so that it can be preblown, but not enough to actually sever it. In this way, the parison is already preblown slightly before the mold walls contact the outer surfaces of the gripping means and force them on together to effect severing. For reasons not completely understood, a better seal is obtained if the parison is preblown slightly before being severed.

Figure 4:
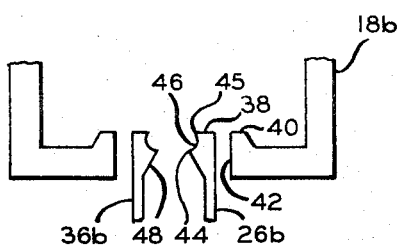
FIG. 4 is a fragmentary view of an alternate embodiment of the instant invention.

It is preferred that the sealing and severing means, whether it be an extension of the lower portion of the mold or the gripping jaws, have a configuration of the general nature shown in FIGS. 1 and 4. While it is not essential to this invention, a better seal is obtained if the sealing and severing area has a severing edge which is the furthermost extension thereof; this severing edge cooperates with a matching edge on the opposing element to sever the parison. Preferably these edges are disposed so as to project past a theoretical centerline between the two elements when the mold is closed for a distance of 0.5 to 5, preferably 1 to 4, mils. Adjacent a bottom wall-forming portion of the sealing and severing means is a second projection which cooperates with a matching projection on the opposing element to hold said thus severed parison within a bead-forming cavity. This bead-forming cavity, disposed between the holding projection and the severing edge, preferably has a circular configuration although other configurations can be used.

Referring now to the FIGURES, particularly FIG. 1, there is shown one embodiment of this invention whereby a parison 12 is held by thread-forming jaws 14 in a molding zone equipped in accordance with this invention. Thread-forming head 14 can be identical to that shown in Turner et al., U.S. Pat. No. 3,390,426, the disclosure of which is hereby incorporated by reference. Parison 12 is disposed between opposed mold halves 16 and 18. The mold halves are moved into and out of engagement by means of air cylinder 20. Arm 22 is attached at one end thereof to mold half 18 by means of pin 24 and has at the other end thereof gripping means 26. Integral with arm 22 is cam follower 28 which rides in curved cam track 30 in block 32. As can be seen from this FIGURE, cam track 30 is so contoured that on the initial forward movement of mold half 18, gripping means 26 is advanced radially inwardly. Thereafter, cam track 30 is so contoured that gripping means 26 follows an axial path straight downward. A second arm 34, identical to arm 22, is attached in an analogous manner to mold half 16 by pin 25 and travels in a corresponding cam track carrying a gripping means 36 which is a mirror image of gripping means 26. Thus, when mold halves 16 and 18 are closed, gripping elements 26 and 36 converge on the end of parison 12 and thereafter move downwardly, and in so doing, stretch the parison 12 longitudinally. Preblow air is introduced through line 37 and main blow air through line 39.

Figure 2:
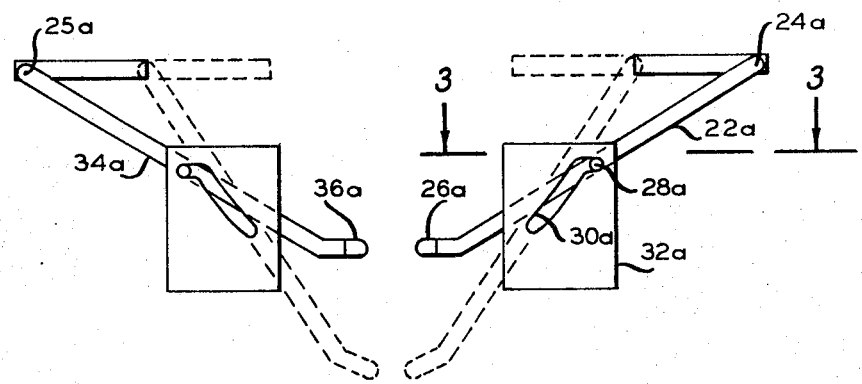
FIG. 2 is an elevational view of apparatus in accordance with an alternate embodiment of the invention.

FIG. 2 shows an alternate arrangement of the parison gripping and stretching means wherein gripping jaws 26a and 36a are carried by arms 22a and 34a. The dotted lines show the position of the gripping and stretching means after arms 22a and 34a have been caused to move inward and then axially downward by the forward movement of pins 24a and 25a. The apparatus shown in FIG. 2 differs from that shown in FIG. 1 in that it is adapted to be disposed parallel to a plane of separation of the mold halves so that inward motion of the mold halves is translated 90° by a mechanism not shown to effect forward movement of pins 24a and 25a.

Figure 3:
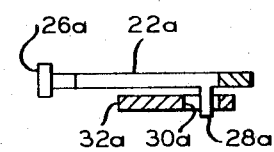
FIG. 3 is a cross section along section line 3-3 of FIG. 2.

FIG. 3 is a cross section along line 3–3 of FIG. 2 showing the relationship of the cam follower 28a to the cam track 30a within block 32a.

In FIG. 4, there is shown an alternative embodiment of the instant invention wherein gripping means 26b and 36b terminate their downward motion at a point such that an upper surface 38 thereof cooperates with upper surface 40 of mold half 18b to constitute a bottom wall-forming surface of the article being molded. Forward surface 42 of mold half 18b contacts gripping means 26b and in a like manner, a forward surface of the opposing mold wall contacts gripping element 36b to force the gripping elements to further converge so that severing edge 44 on the leading surface of gripping means 26b can cut the parison in cooperation with a matching edge on the opposing gripping means. Adjacent bottom wall-forming surface 38 is a second projection 45 which does not project as far as severing element 44. As can be seen, severing edge 44 is spaced back a short distance from bottom wall-forming surface 38. This holding projection tends to hold polymer within bead-forming cavity 46 during the blowing operation. Angled surfaces 48 cause the severed tail portion of the parison to fall free so that the resulting article has a recessed bottom with a depending bead along the sealing seam. The contoured sealing and severing element can be shaped so as to give a flush cut with no depending bead. This configuration is identical to that shown on the mold halves of FIG. 1. In both instances, it is preferred the severing edges extend past a theoretical centerline separating them a distance of 0.5 to 5, preferably 1 to 4, mils.

Many conventional parts such as temperature controllers, cooling channels, and the like, have been omitted for the purpose of simplicity, but their inclusion is understood by those skilled in the art and is within the scope of the invention.

ILLUSTRATIVE EMBODIMENT

Polypropylene homopolymer having a density of 0.905 (ASTM D 1505–63T), a melt flow of 2 (ASTM D 1238–62T, Condition L), and a crystalline melting point of 340° F. is extruded into tubing having an outside diameter of 0.8 inch and a wall thickness of 0.150 inch. The tubing is cooled to room temperature in a vacuum sizing and quenching chamber and cut into 7-inch lengths. These 7-inch lengths are heated to a temperature of 320° F. The thus heated blanks are placed in thread-forming jaws such as those shown in FIG. 1. As the mold walls close, gripping elements attached through a mechanical linkage to the mold halves, as shown in FIG. 1, converge to close off an open end of the parison and then descend to stretch the parison axially. Thereafter, the mold walls continue to converge and close on the thus stretched parison. During this closing of the mold halves, preblow air at a pressure of 150 p.s.i.g. is introduced into the interior of the parison. This pressure introduction is continued after the mold walls close to blow the parison out into conformity with the interior of the mold halves. The mold halves are then opened and the resulting part, a biaxially oriented, high strength, clear bottle having a strong bottom seal is removed. The seal is a true fusion seal.

While this invention has been described in detail for the purpose of illustration, it is not to be construed as limited thereby, but is intended to cover all changes and modifications within the spirit and scope thereof.

I claim:

1. Apparatus for stretching a parison preform comprising in combination: a first mold half; a second mold half in opposed relationship to said first mold half; a first arm means having a gripping means on one end thereof, said arm being rotatably carried by said first mold half; a second arm means having a gripping means on one end thereof, said second arm means being rotatably carried by said second mold half; a first cam follower attached to said first arm; a second cam follower attached to said second arm; a first cam track adapted to receive said first cam follower; a second cam track adapted to receive said second cam follower, said first and second cam tracks being so contoured that forward motion of said mold halves causes said gripping means to converge and thereafter move axially in a direction parallel to the longitudinal axis of said mold halves.

2. Apparatus according to claim 1 comprising in addition: jaw means disposed adjacent to one end of said mold halves adapted to hold one end of a tubular workpiece as said gripping means seals the other end and moves axially so as to stretch said workpiece.

3. Apparatus according to claim 2 comprising in addition: means to introduce preblow fluid into the interior of said parison.

4. Apparatus according to claim 2 wherein a leading surface of each of said mold halves, adjacent a bottom surface of said mold which forms a part of the bottom wall of the article being molded, has a severing edge disposed a short distance from said wall-forming surface, said leading surface further having a bead-forming cavity between said severing edge and said bottom wall-forming surface.

5. Apparatus according to claim 2 wherein said gripping means at the furthermost extension of its axial travel is positioned in cooperative relationship with leading edges of one end of said mold to form a part of said mold.

6. Apparatus according to claim 4 wherein said bead-forming cavity is round.

7. Apparatus according to claim 5 wherein leading surfaces of said gripping means have matching severing edges disposed a short distance from a bottom wall-forming surface thereof, said leading surfaces of said gripping elements further having a bead-forming cavity between said severing edge and said bottom wall-forming surface.

8. Apparatus according to claim 7 wherein said bead-forming cavity is round.